(12) United States Patent
Raz et al.

(10) Patent No.: US 11,645,339 B2
(45) Date of Patent: May 9, 2023

(54) CREATING A CLUSTERING MODEL FOR EVALUATING A COMMAND LINE INTERFACE (CLI) OF A PROCESS

(71) Applicant: VMware, Inc., Palo Alto, CA (US)

(72) Inventors: Barak Raz, Palo Alto, CA (US); Vamsi Akkineni, Los Gatos, CA (US)

(73) Assignee: VMWARE, INC., Palo Alto, CA (US)

( * ) Notice: Subject to any disclaimer, the term of this patent is extended or adjusted under 35 U.S.C. 154(b) by 653 days.

(21) Appl. No.: 16/502,768

(22) Filed: Jul. 3, 2019

(65) Prior Publication Data
US 2021/0004408 A1 Jan. 7, 2021

(51) Int. Cl.
*G06F 16/906* (2019.01)
*G06F 9/455* (2018.01)

(52) U.S. Cl.
CPC ........ *G06F 16/906* (2019.01); *G06F 9/45558* (2013.01)

(58) Field of Classification Search
CPC ............... G06F 16/906; G06F 9/45558; G06F 9/45512; G06F 2009/45587
See application file for complete search history.

(56) References Cited

U.S. PATENT DOCUMENTS

| 10,354,201 | B1* | 7/2019 | Roy | G06N 20/00 |
| 2018/0181641 | A1* | 6/2018 | Das | G06N 20/00 |
| 2019/0294990 | A1* | 9/2019 | Lopez De Prado | G06N 7/005 |
| 2019/0370347 | A1* | 12/2019 | Levy | G06F 16/355 |
| 2020/0382536 | A1* | 12/2020 | Dherange | G06F 16/906 |

* cited by examiner

*Primary Examiner* — Anhtai V Tran
*Assistant Examiner* — Xiaoqin Hu
(74) *Attorney, Agent, or Firm* — Patterson + Sheridan, LLP (57) ABSTRACT

Certain aspects of the present disclosure relate to methods and systems for evaluating a first command line interface (CLI) input of a process. The method comprises examining the first CLI input and selecting a first clustering model corresponding to the process, wherein the first clustering model is created based on a first clustering configuration and a first feature type combination. The method further comprises creating a first feature combination for the first CLI input based on the first feature type combination, evaluating the first CLI input using the first clustering model and the first feature combination, wherein the evaluating further comprises determining a similarity score corresponding to a similarity between the first feature combination and the one or more clusters, and determining whether or not the first CLI input corresponds to normal behavior based on the similarity score.

21 Claims, 4 Drawing Sheets

CREATING A CLUSTERING MODEL FOR EVALUATING A COMMAND LINE INTERFACE (CLI) OF A PROCESS

BACKGROUND

A data center, in some cases, comprises a plurality of hosts in communication over a physical network infrastructure, each host having one or more virtual computing instances (VCIs) such as virtual machines (VMs) or containers that are connected to logical overlay networks that may span multiple hosts and are decoupled from the underlying physical network infrastructure. Applications running on such VMs are susceptible to malicious attacks. Though certain embodiments are described herein with respect to VMs, it should be noted that the teachings herein may also apply to other types of VCIs.

A malicious attack (e.g., such as performed by malware) on a VM often attacks the application level (e.g., by spreading through the operating environment of the VM, introducing new processes, manipulating processes to communicate with new insecure devices, etc.). AppDefense™ from VMware, Inc. in Palo Alto, Calif. is a product that aims to protect against malicious attacks on VMs and cloud environments. AppDefense™ is a data center endpoint security product that protects applications running on VMs in logical networks. AppDefense™ verifies behaviors of a VM (e.g., actions of a process, including one or more known processes, unwanted processes, changed processes, and/or changed network connections communication ports, etc.) using a data set generated from one or more past behaviors of the VM (e.g., a behavior history or an intended state), which may include behaviors of one or more applications executed by the VM.

A security manager (e.g., AppDefense™) is typically installed in virtualization software (e.g., a hypervisor) to provide an isolated location where, during an "observation period," it can monitor one or more behaviors of a VM and generate a data set (e.g., an intended state) of the VM including information indicating the one or more behaviors. Any behaviors that occur during the observation period may be considered allowed behaviors. For example, the observation period may occur while the VM is running in a controlled environment. Later, during a "monitoring period," the security manager similarly monitors one or more behaviors of the VM and generates a data set (e.g., a digital profile) of the VM including information indicating the one or more behaviors. The monitoring period may be during actual runtime of the VM, where detection of unwanted behavior is desired. A detection system in communication with the security manager may detect unwanted behavior (e.g., security threat) when, for example, a behavior indicated in the digital profile is not indicated in the intended state for the VM. During the observation and the monitoring periods, the security manager may be configured to monitor (1) the execution code associated with each process, (2) the network behavior of the process, and (3) the command and parameters used to execute the process (collectively referred to herein as a command line interface (CLI) argument or input). However, conventionally, in some cases, the security manager may perform a much deeper analysis on evaluating whether a process constitutes a threat based on the process's (1) execution code and (2) the process's network behavior than on the (3) the command and parameters used to execute the process. For example, conventionally, during the observation period, a security manager may be configured to merely record the command and parameters used to execute the process as a string. Later during the monitoring period, the detection system may perform a simple string comparison and then detect an unwanted behavior if the command and parameters that are used to execute the same process is a string that is different from the string previously used for the process during the observation period.

However, performing a string comparison may result in inaccurately detecting unwanted behavior simply because two strings may not be identical. For example, during the observation period, the security manager may observe a first CLI input, including a function and a set of parameters, which may include an IP address. The IP address, for example, may be associated with an internal server that does not ever pose a security risk. However, during the monitoring period, the server may have been moved, resulting in the server being assigned a different IP address. In such an example, a second CLI input for the same process may be associated with a security risk simply because the string associated with the second CLI input is different from the first CLI input, as they comprise different IP addresses. This is even though both IP addresses are associated with an internal server.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1A:
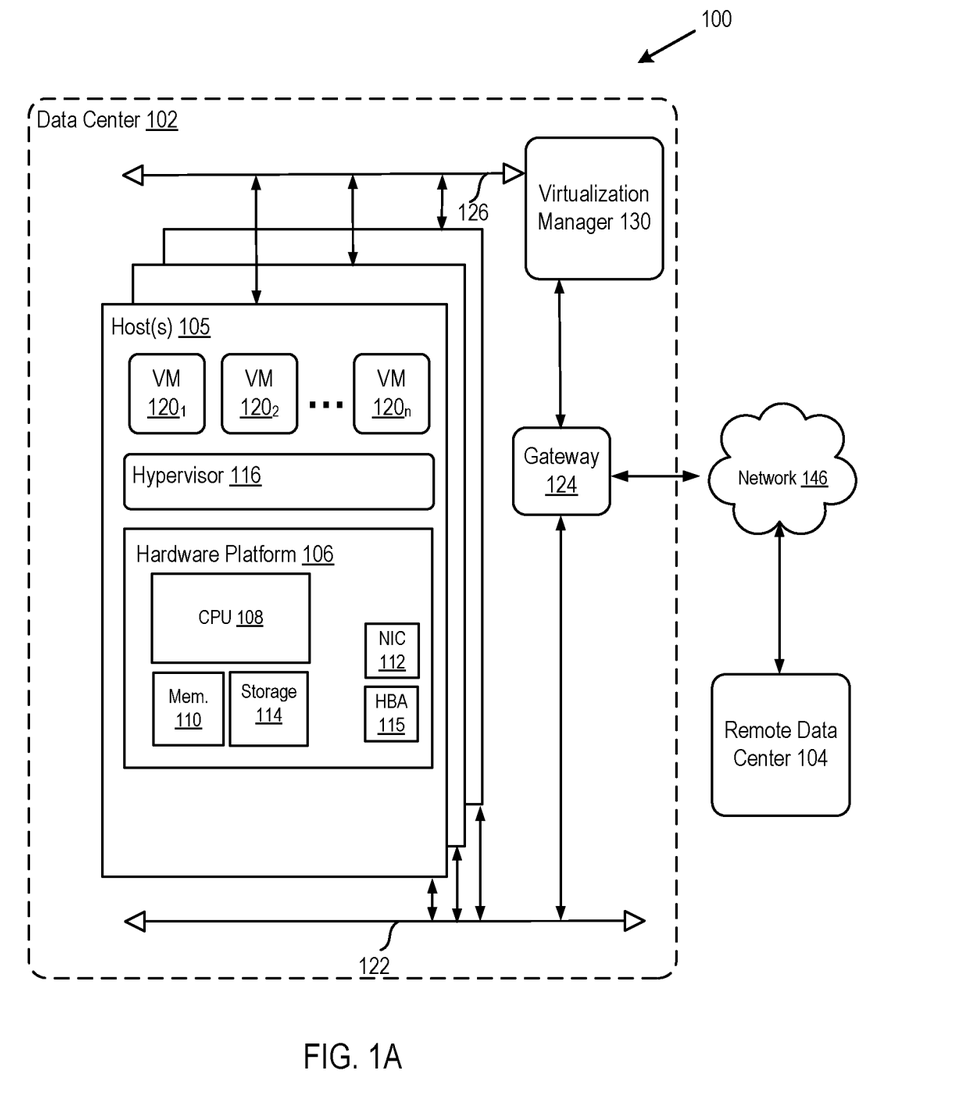
FIG. 1A depicts a block diagram of a computer system, in accordance with certain aspects of the disclosure.

FIG. 1A depicts a block diagram of a computer system 100, in accordance with certain aspects of the disclosure. Data center 102 may be a local data center or a cloud data center (e.g., Amazon Web Services (AWS), Google Cloud, etc.). Data center 102 includes host(s) 105, a gateway 124, a virtualization manager 130, a management network 126, and a data network 122. Each of hosts 105 is typically on a server grade hardware platform 106, such as an x86 architecture platform. Hosts 105 may be geographically co-located servers on the same rack or on different racks in any location in data center 102.

Host 105 is configured with a virtualization layer, referred to herein as hypervisor 116, that abstracts processor, memory, storage, and networking resources of hardware platform 106 into multiple virtual machines $120_1$ to $120_n$ (collectively referred to as VMs 120 and individually referred to as VM 120). VMs on the same host 105 may use any suitable overlaying guest operating system(s) and run concurrently with the other VMs.

Hypervisor 116 architecture may vary. In some aspects, hypervisor 116 can be installed as system level software directly on the hosts 105 (often referred to as a "bare metal" installation) and be conceptually interposed between the physical hardware and the guest operating systems executing in the VMs. Alternatively, hypervisor 116 may conceptually run "on top of" a conventional host operating system in the server. In some implementations, hypervisor 116 may comprise system level software as well as a privileged VM machine (not shown) that has access to the physical hardware resources of the host 105. In such implementations, a virtual switch, virtual tunnel endpoint (VTEP), etc., along with hardware drivers, may reside in the privileged VM. One example of hypervisor 116 that may be used is a VMware ESXi™ hypervisor provided as part of the VMware vSphere® solution made commercially available from VMware, Inc. of Palo Alto, Calif.

Hardware platform 106 of each host 105 includes components of a computing system such as one or more processors (CPUs) 108, a system memory 110, a network interface 112, a storage system 114, a host bus adapter (HBA) 115, and other I/O devices such as, for example, a mouse and keyboard (not shown). CPU 108 is configured to execute instructions such as executable instructions that perform one or more operations described herein. The executable instructions may be stored in memory 110 and in storage 114. Network interface 112 enables host 105 to communicate with other devices via a communication medium, such as data network 122 and/or management network 126. Network interface 112 may include one or more network adapters or ports, also referred to as Network Interface Cards (NICs), for connecting to one or more physical networks.

Gateway 124 (e.g., executing as a virtual appliance) provides VMs 120 and other components in data center 102 with connectivity to network 146 used to communicate with other devices (e.g., remote data center 104). Gateway 124 manages external public IP addresses for VMs 120 and routes traffic incoming to and outgoing from data center 102 and provides networking services, such as firewalls, network address translation (NAT), dynamic host configuration protocol (DHCP), and load balancing. Gateway 124 uses data network 122 to transmit data network packets to hosts 105. In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical network, but different network segments, such as different subnets or different logical VLAN segments.

System memory ("memory") 110 is hardware for allowing information, such as executable instructions, configurations, and other data, to be stored and retrieved. Memory 110 is where programs and data are kept when CPU 108 is actively using them. Memory 110 may be volatile memory or non-volatile memory. Host bus adapter (HBA) couples host 105 to one or more external storages (not shown), such as a storage area network (SAN) or a distributed virtual SAN. Other external storages that may be used include a network-attached storage (NAS) and other network data storage systems, which may be accessible via NIC 112. Storage system 114 represents persistent storage device(s). Storage 114 may be one or more hard disks, flash memory modules, solid state disks, and/or optical disks. Data on storage disks of storage 114 may be organized into blocks, and each block on storage system 114 may be addressable. Although storage 114 is shown as being local to host 105, storage 114 may be external to host 105, such as by connection via HBA 115.

Virtualization manager 130 communicates with hosts 105 via a network, shown as a management network 126, and carries out administrative tasks for data center 102 such as managing hosts 105, managing local VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a VM in one of hosts 105. One example of a virtualization manager is the vCenter Server™ product made available from VMware, Inc. Though certain aspects are described herein with respect to VMs, such aspects are also applicable to other types of virtual computing instances, such as containers.

In certain aspects, virtualization manager 130 includes a hybrid cloud management module (not shown) configured to manage and integrate virtualized computing resources provided by remote data center 104 with virtualized computing resources of data center 102 to form a unified computing platform. The hybrid cloud management module is configured to deploy VMs in remote data center 104, transfer VMs from data center 102 to remote data center 104, and perform other "cross-cloud" administrative tasks. In certain aspects, hybrid cloud management module is a plug-in complement to virtualization manager 130, although other implementations may be used, such as a separate computer program executing in a central server or running in a VM in one of hosts 105. One example of hybrid cloud management module is the VMware vCloud Connector® product made available from VMware, Inc.

Figure 1B:
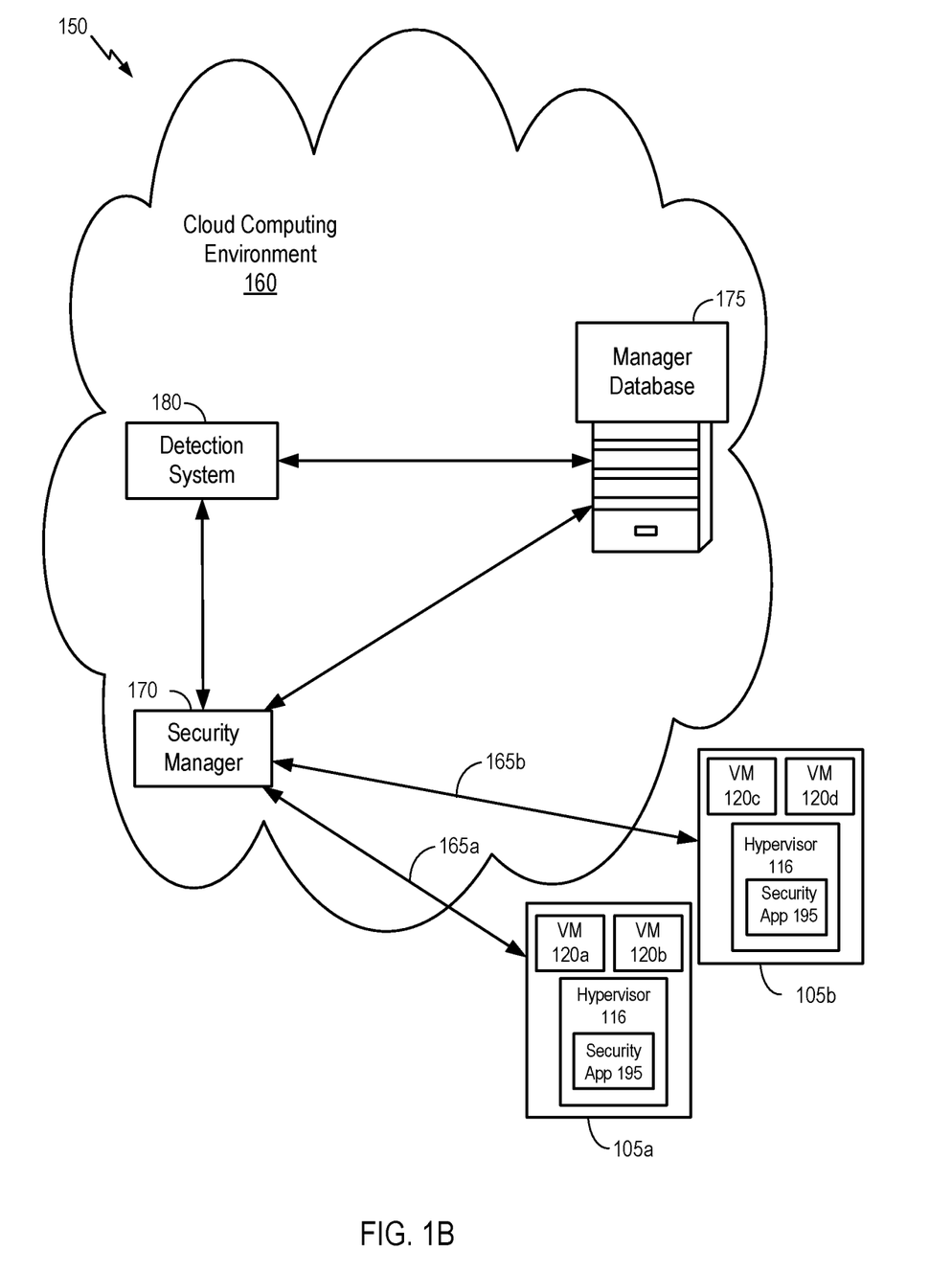
FIG. 1B is a block diagram illustrating a computing system including a cloud computing environment secured by a security manager and a detection system, in accordance with certain aspects of the disclosure.

FIG. 1B is a block diagram of a computing system 150, in which certain aspects may be practiced. Computing system 150 includes a cloud computing environment 160, which may be a data center (e.g., data center 102 or remote data center 104 in FIG. 1A). Cloud computing environment 160 includes hardware resources, storage resources, and networking resources (not shown). Hardware resources may include a number of physical servers/hosts (e.g., hosts 105). Storage resources may include a storage area network (SAN), distributed virtual SAN, or network-attached storage (NAS) and other network data storage systems. Networking resources may include switches, routers, and other network devices for connecting hosts together, hosts to storage resources, and hosts with network entities outside cloud computing environment 160.

In one aspect, cloud computing environment 160 is configured as a dedicated cloud service for a single tenant comprised of dedicated hardware resources (i.e., physically isolated from hardware resources used by other users). In other aspects, cloud computing environment 160 is configured as part of a multi-tenant cloud service with logically isolated virtualized computing resources on a shared physical infrastructure. Processes can be executed on the hardware resources of cloud computing environment 160. For example, processes can be directly executed on hosts of cloud computing environment 160, or in VMs or other virtual entities running on hosts of cloud computing environment 160. These processes may communicate with one another over the network resources, or may even be located on the same hardware resource.

Computing system 150 includes a plurality of VMs 120 and hypervisors 116 running on one or more hosts (e.g., shown as VMs 120a-120d running on hosts 105a-105b) in communication with cloud computing environment 160 through connections 165 (e.g., via a PNIC of hosts 105 and network resources of cloud computing environment 160 (not shown)) to a security manager 170 running as a process or application on hardware resources of cloud computing environment 160. In certain aspects, hosts 105 running VMs 120 are located in the same data center as cloud computing environment 160. In certain aspects, hosts 105 running VMs 120 are located on a separate data center (e.g., data center 102 in FIG. 1A) connected to cloud computing environment 160 through a network (e.g., network 146 in FIG. 1A).

Hypervisors 116 running on hosts 105 include security appliances 195. A security appliance 195 can be prepackaged as part of a hypervisor 116, or may be subsequently added to a hypervisor 116 as additional code/software. Security manager 170 is in communication with security appliances 195 in hypervisors 116 on VMs 120 through connections 165.

Cloud computing environment 160 further includes a detection system 180 running as a process or application on hardware resources of cloud computing environment 160. Detection system 180 is in communication with security manager 170. Detection system 180 is further in communication with a manager database 175. Manager database 175 can be implemented on storage resources of cloud computing environment 160. Security manager 170 is in further communication with manager database 175.

As described above, processes can be directly executed in VMs or other virtual entities running on hosts of cloud computing environment 160. In certain aspects, when a process is executed in a VM 120, detection system 180 uses what is called an "intended state" to detect unwanted behavior associated with the process or application by comparing a digital profile of the VM (e.g., VM 120) to an intended state associated with the VM. In certain aspects, instead of a detection system 180, a service executing in the VM is configured to compare the intended state of a VM with its digital profile in order to detect unwanted behaviors. Using such a service may, in certain aspects, reduce the latency that results from communication with an external system, such as detection system 180.

An intended state is a data set comprising information indicative of one or more behaviors that are indicative of a healthy computing environment (e.g., indicative of no unwanted behaviors in the data set). An intended state may be generated by security manager 170 during an observation period or "learning stage" in a number of ways. As an example, security manager 170 generates an intended state for a VM, such as VM 120a, by monitoring one or more behaviors on one or more VMs (e.g., VMs 120a and 120b) over an observation period. Security manager 170 then stores the generated intended state in manager database 175. In one example, security appliance 195 in hypervisor 116 on host 105a records one or more behaviors of VM 120a and VM 120b over an observation period and sends the one or more recorded behaviors to security manager 170. Security manager 170 monitors the one or more behaviors sent by security appliances 195 and saves information indicative of at least one behavior as an intended state in manager database 175. In certain aspects, generating an intended state involves monitoring the behavior of one or more of VMs 120a and 120b while executing one or more processes (e.g., a server application process, an operating system process (e.g., a Microsoft Windows operating system process), etc.).

After an intended state is generated by security manager 170 for VM 120a, security manager 170 proceeds to generate a digital profile of VM 120a in part by monitoring one or more behaviors of VM 120a using security appliance 195 over a monitoring period and storing information indicative of the one or more monitored behaviors as a digital profile of VM 120a in manager database 175. In certain aspects, detection system 180 accesses an intended state associated with VM 120a and a digital profile of VM 120a from manager database 175 and compares the digital profile to the intended state and determines if the digital profile is indicative of an unwanted behavior on VM 120a. In certain aspects, detection system 180 determines that a digital profile contains information indicative of unwanted behavior on VM 120a in cases where the digital profile of VM 120a contains information indicative of a behavior that is not indicated in an intended state associated with VM 120a. In other aspects, detection system 180 detects unwanted behavior when one or more behaviors indicated in the digital profile of a VM 120a are outliers (e.g., using an entropy-based detection method). For example, a behavior indicated in the digital profile of VM 120a may indicate a deviation from the intended state of VM 120a.

After detection system 180 determines that a digital profile of a VM indicates, for example, a process that is indicative of unwanted behavior, the process may be blocked, the VM may be quarantined by adjusting dynamic firewall parameters, or a response from the VM may be requested before the process is allowed to proceed.

As described above, in some cases, for each process executing on a VM 120, security manager 170 may be configured to perform a relatively extensive analysis on (1) the execution code associated with process and (2) the network behavior of the process, as well as other behaviors. However, in some cases, with respect to the process's CLI input (i.e., the command and parameters used to execute the process), security manager 170 may merely be configured to record the CLI input as a string in the intended state of the corresponding VM. Detection system 180 may then compare the CLI recorded in the intended state with a CLI input that is associated with the same process and recorded in the digital profile of the VM to determine whether the CLI input in the digital profile indicates an unwanted behavior. However, as described above, a simple string comparison may not be very effective in accurately detecting unwanted behavior without generating a lot of false positives and true negatives.

Accordingly, certain embodiments described herein relate to a CLI input analyzer that allows for evaluating each CLI input for each process during the monitoring period in order to determine whether the CLI input is indicative of unwanted behavior (e.g., security threat) or not. More specifically, certain embodiments herein relate to creating or training a clustering model for each process by using a pool of CLI inputs, associated with the process, that are not indicative of unwanted behaviors, meaning they correspond to allowed behaviors. The trained clustering model refers to a combination of a clustering algorithm with a certain clustering configuration and certain feature combination. A clustering configuration, for example, configures the clustering algorithm to cluster the input data into a certain number of clusters, among other things. A feature combination refers to a certain combination of types of features that can be extracted from each CLI input.

Using the trained clustering model, the CLI input analyzer utilizes one of a number of techniques to determine whether a CLI input, received during a monitoring period, is associated with an unwanted behavior or not. The trained clustering model may also be further retrained based on user feedback received in response to the performance of the clustering model. For example, user feedback may indicate that a certain CLI input, which is detected by the clustering model as being associated with unwanted behavior, is in fact indicative of normal behavior (also referred to as "normal CLI input"). In such an example, the clustering model is further trained by taking into account this user feedback, thereby allowing the clustering model to more accurately categorize future CLI inputs as unwanted or normal. Note that although certain embodiments described herein relate to processes executing on VMs and techniques for identifying unwanted behavior associated with such processes, the same techniques are also applicable to processes executing on physical computing systems or devices.

Figure 2:
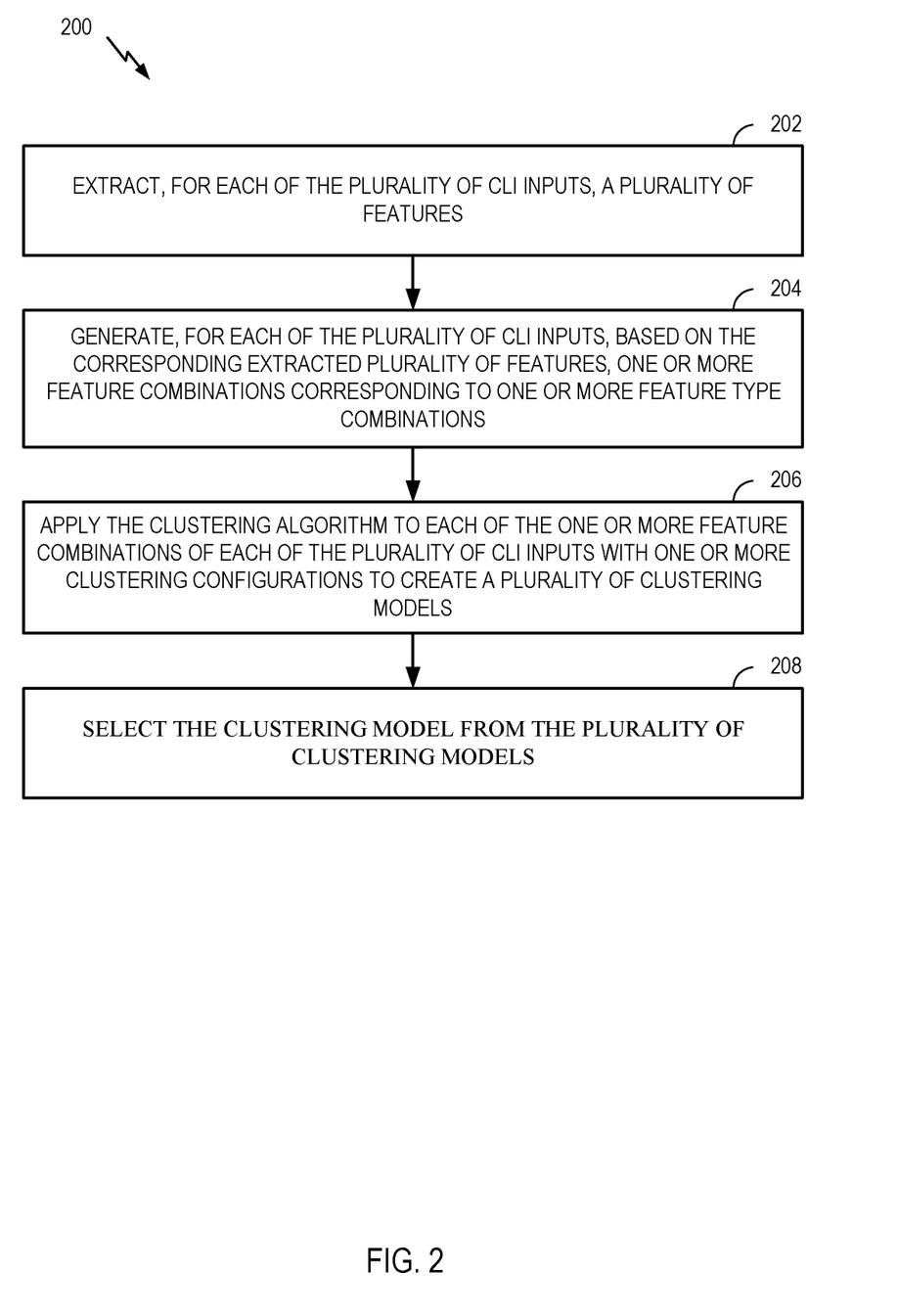
FIG. 2 illustrates example operations carried out to create a clustering model for a process, in accordance with certain aspects of the disclosure.

FIG. 2 illustrates example operations 200 carried out to create a clustering model for a process that may be executed on a computing system, such as VM 120 or a physical machine. Operations 200 are described below with reference to FIGS. 1A and 1B. Operations 200 may be performed by computing system (e.g., physical or virtual) that may or may not be a part of the data center 102 or cloud computing environment 160. As an example, operations 200 may be performed by security manager 170 during a learning stage to create an intended state (e.g., for VM 120a), by monitoring one or more behaviors on one or more VMs (e.g., VMs 120a and/or 120b) over an observation period. For example, security manager 170 may monitor the behaviors over an observation period to record a pool of CLI inputs associated with each process during the observation period.

At block 202, a computing system extracts, for each of the plurality of CLI inputs, a plurality of features. Each VM 120 may execute a large number of processes on a regular basis. What may be considered a healthy or normal CLI input for one process may not be considered normal for another process. Accordingly, in certain embodiments, it's important to separately create a clustering model for every process by using a pool of normal CLI inputs associated with the process. Although, in certain other embodiments, a single clustering model may be created for all processes. In other words, in such embodiments, the clustering model is not per-process.

Each CLI input includes two main parts, a function name (e.g., full path, relative path, or the name of the corresponding process) and a number of parameters. The parameters may hold one or more of three types of variables including a positional variable, key-value variable and a flag variable. A flag variable is a stand-alone key that does not have a value. A positional variable is a bare value without a key. A key-value pair is also referred to as a named variable, where the key identifies the value.

The computing system accesses CLI input pool associated with a certain process and extracts different types of features from each CLI input using various feature extraction or creation techniques. Some example feature types may include: the length of the CLI input parameters (with or without the function portion of the CLI input), the entropy of the CLI input parameters (with or without the function portion of the CLI input), the CLI input pattern as a categorical feature, the CLI input pattern as an integer, and a plurality of n-gram features such as 2 grams, 3 grams, 4 grams, 5 grams, 2 grams and 3 grams, 3 grams and 4 grams, 4 grams, and 5 grams. The length of the parameters of a CLI input refers to the combined length of all the parameters' strings. The entropy of the CLI input parameters refers to a measure of the order (or consistency) of the parameters in a data set. The lower the entropy, the more consistent the data set is as a whole. One of ordinary skill in the art can appreciate that various techniques may be used to determine the entropy of a CLI input's parameters. One example technique is halo-entropy, which is a technique for identifying one or more outliers in a data set. Shu Wu and Shengrui Wang in Information-Theoretic Outlier Detection for Large-Scale Categorical Data, *IEEE Transactions on Knowledge and Data Engineering,* 2013, disclosed a "halo-entropy computation" to identify a user defined number of outliers in a data set by identifying the data points that contribute most to the entropy of the data set.

The CLI pattern, as a categorical feature, is representative of the pattern of the CLI input, which, in one example, may refer to the type and count of the different parameters in the CLI input. In certain embodiments, a feature creation technique may be used to determine the number of key-value variables, positional variables, and flag variables in a CLI input and then generate a categorical feature set that represents the pattern.

An example of a CLI input is: test.exe pos1 -key1 val1/flag1 key2=val2 pos2. "test.exe" is the function. "Pos1" is a positional because it is a value without a preceding key. "Pos2" is also a positional for the same reason. The CLI input includes two key-values including "-key1 val1" and "key2=val2. " A key can be identified when it is followed by a value and preceded by a "key" identifier (e.g. "/", "-") or when an assignment identifier (e.g., ":", "=") is in-between the "key" and "value." The CLI input also includes a flag, which, similar to a key is identified by a key identifier, but it is not followed by a value. In this example, there are, therefore, two positional variables, two key-value variables, and one flag. The resulting pattern of the CLI input in this case is, therefore, represented by a data set {2, 2, 1}. Based on this data set, the computing system may then be configured by a feature creation technique to assign the CLI input to a certain categorical feature set from a pool of multiple categorical feature sets. Each categorical feature set may represent one or more CLI input patterns. As an example, a list of five categorical feature sets {00001}, {00010}, {00100}, {01000}, {10000} may be defined. In the example above, the CLI input with pattern {2, 2, 1} may be assigned to the first categorical feature set {00001}. Other CLI inputs with the same parameter count will also be assigned to the same categorical feature set. Note that one of several techniques (e.g., text parser) may be used to identify the number of key-value, positional, and flag variables in each CLI input.

The pattern of a CLI input may also be represented as an integer. In order to generate an integer for each CLI input based on the corresponding pattern, a feature creation technique may be used to analyze a large set of CLIs (e.g., all possible CLIs) for a process and transform each CLI input pattern to an integer. For example, a first CLI input may have a pattern {2, 2, 1}, a second CLI input may have a pattern {1, 2, 3}, and a third CLI input may have a pattern {1, 0, 3}. After analyzing all the CLI inputs and generating these patterns that represent the counts of the different variables in the CLI inputs, a transformation technique may be used to transform each of these patterns into an integer. One possible formula to perform such a transformation is: $\Sigma_{1+}^{n} b^{n-i} * x_i$.

In this formula, n refers to the number of data points in each pattern. For example, each of the patterns above have three data points, thereby n equals "3" for each of them. i refers the position of the data point in the data set. For example, in data set {2, 2, 1}, the first "2" corresponds to i=1, the second "2" corresponds to i=2, and the "1" corresponds to i=3. b refers to the largest number in all of the data sets. x refers to the actual data point. For example, $x_1$ of the first data set {2, 2, 1} is 2, $x_2$ of the first data set is 2, and $x_3$ of the first data set is 3. Accordingly, using the formula above, the first data set may be converted to: $(3^{3-1}*2)+(3^{2-1}*2)+(3^{1-1}*1)=18+6+1=25$. An integer may be created for each of the other patterns using the same formula.

As described above, the computing system may also utilize an n-gram feature creation technique to generate a pool of n-grams from the plurality of CLI inputs. For example, the computing system may generate unigrams, 2 grams, 3 grams, 4 grams, 5 grams, etc., for all the CLI inputs. To illustrate this with an example, 2 grams may be generated for a pool of two CLI inputs including a first CLI input (test.exe -param1 value --param2) and a second CLI input (test.exe -param3 value --param4). The list of generated 2 grams for the first CLI input and the second CLI input includes: '-', 'v', '--', '-p', '1', '3', 'al', 'am', 'ar', 'e', 'lu', 'm1', 'm2', 'm3', 'm4', 'pa', 'ra', 'ue', 'va'. In such an example, a feature vector is created for the first CLI input, where the feature vector is: [1, 1, 1, 2, 1, 0, 1, 2, 2, 1, 1, 1, 1, 0, 0, 2, 2, 1, 1]. Another feature vector is created for the second CLI input, where the feature vector is: [1, 1, 1, 2, 0, 1, 1, 2, 2, 1, 1, 0, 0, 1, 1, 2, 2, 1, 1]. The computing system may then be configured with an n-gram selection technique to compare feature vectors of all CLI inputs for all types of n-grams and select only the n-grams that exist in at least a certain percentage of the CLI inputs.

To illustrate this with a simple example, if the feature vector for the first CLI input is [1, 1, 1, 2, 1, 0, 1, 2, 2, 1, 1, 1, 1, 0, 0, 2, 2, 1, 1], the feature vector for the second CLI input is [1, 1, 1, 2, 0, 1, 1, 2, 2, 1, 1, 0, 0, 1, 1, 2, 2, 1, 1], a feature vector for a third CLI input is [1, 1, 1, 2, 0, 1, 1, 2, 2, 1, 1, 0, 0, 1, 1, 2, 2, 1, 1], and the n-gram selection technique is configured to select n-grams that are in at least 50% of the CLI inputs, then the n-grams that are selected are: '-', 'v', '--', '-p', '3', 'al', 'am', 'ar', 'e', 'lu', 'm3', 'm4', 'pa', 'ra', 'ue', 'va' because '1', 'm1', 'm2', are not present in more than 50% of the CLI inputs, assuming the pool of CLI inputs only include the three CLI inputs with the feature vectors shown above. The computing system further extracts other types of n-grams (e.g., 3 grams, 4 grams, and so on) for all the CLI inputs in the pool of CLIs. The computing system then, similarly, selects the n-grams that exist in a certain percentage of the CLI inputs. Note that this percentage may be defined and changed by a user.

At block 204, the computing system generates, for each of the plurality of CLI inputs, based on the corresponding extracted plurality of features, one or more feature combinations corresponding to one or more feature type combinations. For example, multiple feature combinations may be generated or defined, where each feature combination may correspond to a different subset of a set of possible feature types (i.e., different feature type combinations). As described above, in one example, the set of possible feature types are: the length of the CLI input parameters (with or without the function portion of the CLI input), the entropy of the CLI input parameters (with or without the function portion of the CLI input), the CLI input pattern as a categorical feature, the CLI input pattern as an integer, and a plurality of n-gram features such as 2 grams, 3 grams, 4 grams, 5 grams, 2 grams and 3 grams, 3 grams and 4 grams, 4 grams, and 5 grams. Note that these are merely examples of feature types and that, in other embodiments, other types of features may be used instead. The number of feature types in the set of possible feature types may also be different in various embodiments. Note that a feature combination results from extracting features from a CLI input based on a certain feature type combination. In other words, the feature combination actually refers to the feature vector that is created.

At block 206, the computing system applies the clustering algorithm to each of the one or more feature combinations of each of the plurality of CLI inputs with one or more clustering configurations to create a plurality of clustering models. For example, the computing system may select a clustering algorithm, such as the k-means clustering algorithm, although other types of clustering algorithms are also within the scope of this disclosure. The k-means clustering algorithm may be configured with one of a number of possible clustering configurations. Each clustering configuration may cluster data into a different number of clusters. The number of clusters may be referred to as k. For example, if six different clustering configurations for the k-means clustering algorithm are defined (e.g., by a user or the computing system), the first clustering configuration may cluster data into a single cluster, the second clustering configuration may cluster data into two clusters, . . . , and the sixth clustering configuration may cluster data into six clusters.

In one example, the number of feature type combinations may be F and the number of clustering configurations may be K. The computing system may then be configured to perform a plurality of test runs, each test run involving the application of a clustering algorithm with a certain clustering configuration (selected from the K clustering configurations) to a feature combination corresponding to a certain feature type combination (selected from the F feature type combinations) for each of the CLI inputs. For example, a first test run may involve applying the k-means clustering algorithm with a first configuration (K=1) to a feature combination corresponding to a first feature type combination (F=1) for each of the CLI inputs. As an example, the first feature type combination may include feature types: (1) the length of the CLI input parameters, (2) the CLI input pattern as an integer, (3) and 2 grams. The second test run may involve applying the k-means clustering algorithm with the first configuration (K=1) to a feature combination corresponding to a second feature type combination (F=2) for each of the CLI inputs.

Additional test runs may correspond to the application of the k-means clustering algorithm with the first configuration (K=1) paired with each of the other feature type combinations (feature combinations 3 through F). In other words, a first group of test runs correspond to the following mixture of clustering configuration and feature type combinations: ((K=1, F=1), (K=1, F=2), (K=1, F=3), (K=1, F=4), . . . , (K=1, F=F). A second group of test runs involve a mixture of a different clustering configuration with the feature type combinations: ((K=2, F=1), (K=2, F=2), (K=2, F=3), (K=2, F=4), . . . , (K=2, F=F). Similarly, a final set of test runs involves the mixture of the last clustering configuration with the feature type combinations: ((K=K, F=1), (K=K, F=2), (K=K, F=3), (K=K, F=4), . . . , (K=K, F=F). In other words, each test run involves a different mixture of one of the clustering configurations and one of the feature type combinations, such that overall, K*F test runs are performed.

At block 206, the computing system selects a clustering model with a certain configuration and a certain feature type combination. These test runs are performed, at step 204, so that the clustering model with the optimal combination of K and F can be selected. One of a variety of techniques may be used to analyze each clustering model. In one example, the computing system may be configured to perform what is referred to as a Silhouette analysis. The Silhouette analysis can be used to measure the separation distance between the resulting clusters. The Silhouette analysis may also provide a Silhouette plot that displays a measure of how close each data point in one cluster is to points in the neighboring clusters and thus provide a way to assess parameters like the optimal number of clusters K. For example, the computing system may be configured to calculate an average Silhouette score and a Silhouette standard deviation for each test run to evaluate the strength of the test run's clustering model. A clustering model refers to a dataset with a feature combination corresponding to a certain feature type combination, where the feature combination that has been clustered with a clustering algorithm having a certain clustering configuration.

The average Silhouette score for each test run refers to an average of all Silhouette scores, where each of the Silhouette scores is calculated for a different CLI input in the pool of CLI inputs. For example, the first test run may involve the application of the k-means clustering algorithm having a first clustering configuration (K=1) to a feature combination correspond to a first feature type combination (F=1) of all the CLI inputs. This results in a Silhouette score for each of the CLI inputs. An average of all the Silhouette scores for all the CLI inputs provides an average Silhouette score for the test run. Similarly, an average Silhouette score is calculated for each of the other test runs. As described above, in certain embodiments, the computing system also calculates a Silhouette standard deviation.

For example, the computing system selects the most optimal clustering model from all of the different clustering models. In embodiments where the Silhouette analysis is performed for the selection of the clustering model, the computing system selects the clustering model with the highest ratio of the Silhouette average over Silhouette standard deviation $$\left(\frac{avg}{std}\right).$$

In certain embodiments, in order to process a smaller amount of data when selecting a clustering model using the Silhouette analysis, only clustering models with a Silhouette average above a certain threshold are considered as candidates during the selection process. For example, as described above, each of the test runs corresponds to a certain clustering model associated with a certain clustering configuration and a certain feature type configuration. The application of each clustering model for each test run results in a certain Silhouette average score. The clustering models with a Silhouette average score below, for example, 80% may not be included in a pool of clustering models for the final selection of the optimal clustering model. For the clustering models with average Silhouette score equal to or above 80%, the computing system calculates the ratio of the Silhouette average score over the Silhouette standard deviation. The clustering model having the highest ratio may be selected as the most optimal clustering model. Note that the 80% threshold is user-defined and adjustable.

Once a certain clustering model is selected for a certain process, it may be stored in a database, such as manager database 175, as the intended state of a VM 120's behavior. The clustering model may be accessed for use in evaluating new CLI inputs of the same process and detecting unwanted behaviors of a corresponding VM 120. A plurality of other clustering models are similarly selected for the other processes (e.g., by repeating steps 202-206 for the other processes). The other clustering models are also stored in the database.

Figure 3:
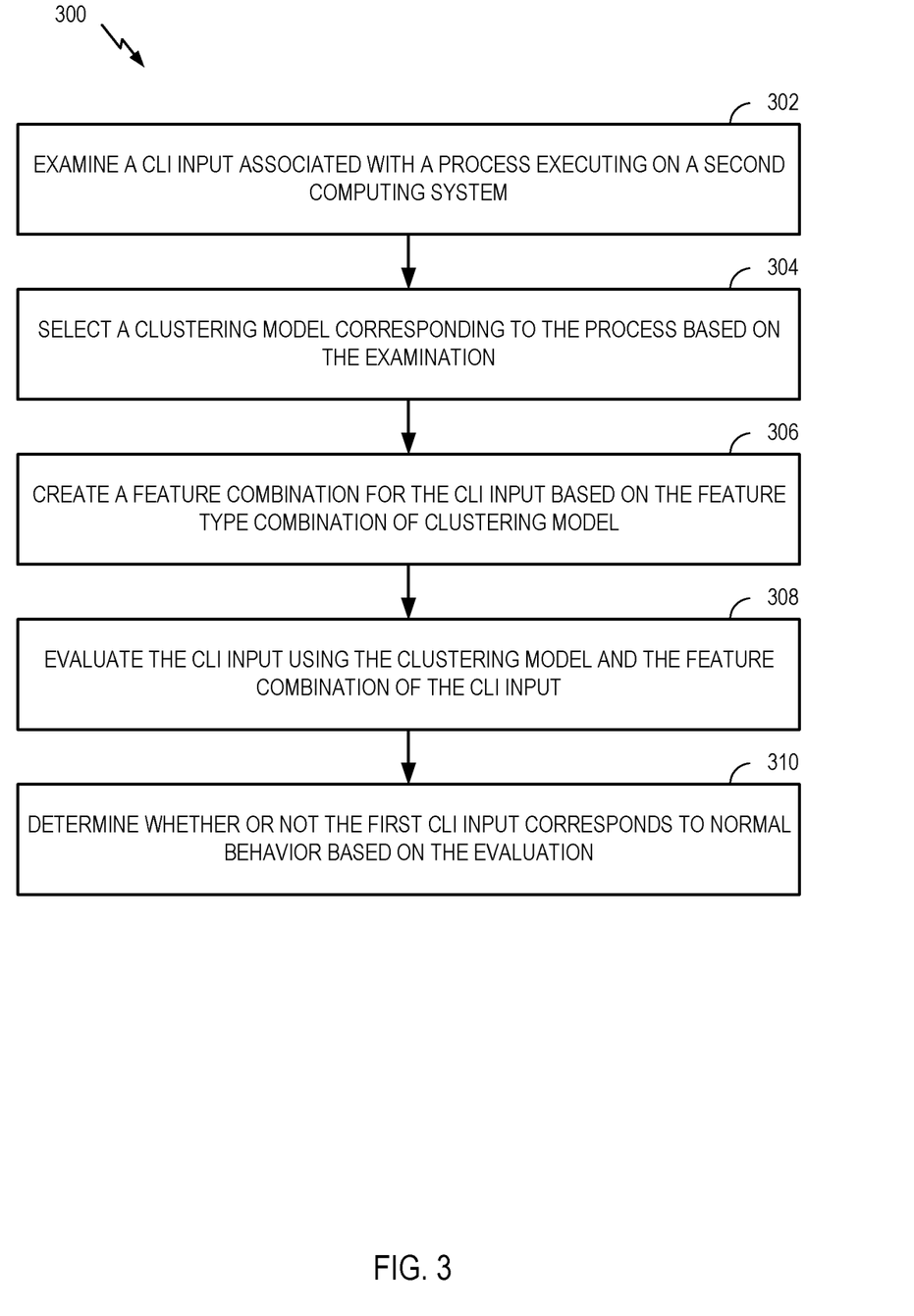
FIG. 3 illustrates example operations carried out to evaluate new CLI inputs associated with various processes being executed on, in accordance with certain aspects of the disclosure.

FIG. 3 illustrates example operations 300 carried out to evaluate new CLI inputs associated with various processes being executed on, for example, a VM. Operations 300 may be carried out by any computing system (e.g., physical or virtual). In one example, operations 300 are carried out by detection system 180. Blocks 302 and 304 are described by reference to such an example. Operations 300 may be performed over a monitoring period, during which a second computing system (e.g., physical or virtual) may execute processes whose CLI inputs are not guaranteed to represent normal behavior. In one example, the second computing system may be the same as the computing system that performs operations 300. In another example, the second computing system is different from the computing system that performs operations 300.

At 302, the computing system examines a CLI input associated with a process executing on the second computing system. For example, security manager 170 may be configured to monitor the process executing on the second computing system and record information about the process, including the CLI input that triggered the execution of process. Security manager 170 may then store such information in a digital profile of the second computing system in manager database 175. The detection system 180 may then retrieve the information, including the CLI input associated with the process, from manager database 175 and use a CLI input analyzer to examine the CLI input. Examining the CLI input may include parsing it to determine the function name indicated by the CLI input.

At 304, the computing system selects a clustering model corresponding to the process based on the examination. As described above, having parsed the CLI input, the CLI input analyzer of detection system 180 is able to identify the function name indicated by the CLI input. Based on the name of the function, the CLI input analyzer is then configured to search for the corresponding clustering model in a database (e.g., manager database 175). A clustering model that is stored in the database is identifiable based on its corresponding function name (e.g., process name). The selected clustering model is associated with a certain clustering configuration and a certain feature type combination.

At 306, a computing system creates a feature combination for the CLI input based on the feature type combination of the clustering model. For example, the feature type combination of the selected clustering model may include six feature types: (1) the length of the CLI input parameters, (2) the entropy of the CLI input parameters, (3) the CLI input pattern as a categorical feature, (4) the CLI input pattern as an integer, (5) 3 grams and 4 grams, AND (6) 4 grams and 5 grams. In such an example, the CLI input analyzer creates a feature combination for the CLI input corresponding to those six feature types.

At block 308, the computing system evaluates the CLI input using the clustering model and the feature combination of the CLI input. One of several techniques may be used to evaluate whether a feature combination corresponds to normal behavior. In one example, a similarity metric may be used to determine the similarity between the feature vector and the one or more clusters of the clustering model, where each of the clusters corresponds to a concentration of a plurality of feature combinations that represent normal behavior (e.g., normal CLI inputs). An example, a similarity metric is a distance metric that may be used to determine the distance between the feature vector and the one or more clusters of the clustering model. An example of a distance metric is the Euclidean distance metric, which measure the distance between the feature vector from the clusters' centroids.

At block 310, the computing system determines whether or not the CLI input corresponds to normal behavior based on the evaluation. For example, if the calculated similarity metric is above a certain threshold, detection system 180 is configured to determine that the CLI input does not indicate unwanted behavior. However, if the similarity metric is below the threshold, detection system 180 is unable to determine that the CLI input does not indicate unwanted behavior. As such, in certain embodiments, detection system 180 may be configured to issue an alert to a user that is monitoring the VM on which the process associated with the CLI input is being executed. In such an example, the user may view the alert and determine that the CLI input relates to normal behavior. This feedback is then received by detection system 180 in order to retrain the clustering model. One of ordinary skill in the art can appreciate the various techniques that may be used to retrain a clustering model using user feedback.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method of evaluating a first command line interface (CLI) input of a process executing on a computing system, comprising:
examining the first CLI input;
selecting a first clustering model corresponding to the process based on examining the first CLI input, wherein the first clustering model is created based on a first clustering configuration and a first feature type combination identifying a first set of feature types of a plurality of feature types, wherein:
the first clustering model corresponds to a data set created as a result of an application of a clustering algorithm with the first clustering configuration to a plurality of first feature combinations corresponding to a plurality of CLI inputs, each of the plurality of first feature combinations comprising a corresponding first set of features of the corresponding CLI input, each of the first set of features having a feature type of the first set of feature types;
the first clustering configuration configures the clustering algorithm to cluster the data set into one or more clusters;
creating a first feature combination for the first CLI input based on the first feature type combination, wherein the first feature combination comprises a given feature that is representative of a given pattern of the first CLI input based on a first number of key-value variables included in the first CLI input, a second number of positional variables included in the first CLI input, and a third number of flag variables included in the first CLI input;
evaluating the first CLI input using the first clustering model and the first feature combination, wherein the evaluating further comprises determining a similarity score corresponding to a similarity between the first feature combination and the one or more clusters of the first clustering model;
determining whether or not the first CLI input corresponds to normal behavior based on the similarity score; and retraining the first clustering model using the first CLI input when the first CLI input corresponds to the normal behavior.

2. The method of claim 1, further comprising: creating the first clustering model for the process prior to the examining, wherein the creating further comprises: extracting, for each of the plurality of CLI inputs, a plurality of features; generating, for each of the plurality of CLI inputs, based on the corresponding extracted plurality of features, one or more feature combinations corresponding to one or more feature type combinations; applying the clustering algorithm to each of the one or more feature combinations of each of the plurality of CLI inputs with one or more clustering configurations to create a plurality of clustering models including the first clustering model, wherein for each application of the clustering algorithm: the clustering algorithm is applied with one of the one or more clustering configurations; and the clustering algorithm is applied to one of the one or more feature combinations for each of the plurality of CLI inputs; and selecting the first clustering model from the plurality of clustering models.

3. The method of claim 2, wherein selecting the first clustering model comprises: performing analysis for each of the plurality of clustering models to generate an average score and a standard deviation for each of the plurality of clustering models; identifying one or more clustering models from the plurality of clustering models having average scores above a threshold; generating a ratio for each of the identified one or more clustering models, the ratio corresponding to a ratio of an average score of a corresponding clustering model to a standard deviation of the corresponding clustering model; and selecting the first clustering model from the identified one or more clustering models based on the ratios of the identified one or more clustering models.

4. The method of claim 3, wherein the first clustering model has a highest ratio among all the identified one or more clustering models.

5. The method of claim 3, wherein the analysis comprises a silhouette analysis.

6. The method of claim 2, wherein extracting the plurality of features from each of the plurality of CLI inputs comprises extracting a categorical feature corresponding to a pattern of the corresponding CLI input.

7. The method of claim 6, wherein: the pattern of the corresponding CLI input corresponds to a number and type of parameters in the corresponding CLI input; and the categorical feature represents the pattern of the corresponding CLI input.

8. An apparatus, comprising:
a non-transitory memory comprising executable instructions; and
a processor in data communication with the non-transitory memory and configured to execute the instructions to cause the apparatus to:
examine a first command line interface (CLI) input of a process;
select a first clustering model corresponding to the process based on examining the first CLI input, wherein the first clustering model is created based on a first clustering configuration and a first feature type combination identifying a first set of feature types of a plurality of feature types, wherein:
the first clustering model corresponds to a data set created as a result of an application of a clustering algorithm with the first clustering configuration to a plurality of first feature combinations corresponding to a plurality of CLI inputs, each of the plurality of first feature combinations comprising a corresponding first set of features of the corresponding CLI input, each of the first set of features having a feature type of the first set of feature types;
the first clustering configuration configures the clustering algorithm to cluster the data set into one or more clusters;
create a first feature combination for the first CLI input based on the first feature type combination, wherein the first feature combination comprises a given feature that is representative of a given pattern of the first CLI input based on a first number of key-value variables included in the first CLI input, a second number of positional variables included in the first CLI input, and a third number of flag variables included in the first CLI input;
evaluate the first CLI input using the first clustering model and the first feature combination, wherein the processor being configured to cause the apparatus to evaluate the first CLI input further comprises the processor being configured to cause the apparatus to determine a similarity score corresponding to a similarity between the first feature combination and the one or more clusters of the first clustering model;
determine whether or not the first CLI input corresponds to normal behavior based on the similarity score; and
retrain the first clustering model using the first CLI input when the first CLI input corresponds to the normal behavior.

9. The apparatus of claim 8, wherein the processor is further configured to cause the apparatus to: create the first clustering model for the process prior to the examining, wherein the processor being configured to cause the apparatus to create further comprises the processor being configured to cause the apparatus to: extract, for each of the plurality of CLI inputs, a plurality of features; generate, for each of the plurality of CLI inputs, based on the corresponding extracted plurality of features, one or more feature combinations corresponding to one or more feature type combinations; apply the clustering algorithm to each of the one or more feature combinations of each of the plurality of CLI inputs with one or more clustering configurations to create a plurality of clustering models including the first clustering model, wherein for each application of the clustering algorithm: the clustering algorithm is applied with one of the one or more clustering configurations; and the clustering algorithm is applied to one of the one or more feature combinations for each of the plurality of CLI inputs; and select the first clustering model from the plurality of clustering models.

10. The apparatus of claim 9, wherein the processor being configured to cause the apparatus to select the first clustering model further comprises the processor being configured to cause the apparatus to: perform analysis for each of the plurality of clustering models to generate an average score and a standard deviation for each of the plurality of clustering models; identify one or more clustering models from the plurality of clustering models having average scores above a threshold; generate a ratio for each of the identified one or more clustering models, the ratio corresponding to a ratio of an average score of a corresponding clustering model to a standard deviation of the corresponding clustering model; and select the first clustering model from the identified one or more clustering models based on the ratios of the identified one or more clustering models.

11. The apparatus of claim 10, wherein the first clustering model has a highest ratio among all the identified one or more clustering models.

12. The apparatus of claim 10, wherein the analysis comprises a silhouette analysis.

13. The apparatus of claim 9, wherein extracting the plurality of features from each of the plurality of CLI inputs comprises extracting a categorical feature corresponding to a pattern of the corresponding CLI input.

14. The apparatus of claim 13, wherein: the pattern of the corresponding CLI input corresponds to a number and type of parameters in the corresponding CLI input; and the categorical feature represents the pattern of the corresponding CLI input.

15. A non-transitory computer readable medium having instructions stored thereon that, when executed by a computing system, cause the computing system to perform operations comprising:
examining a first command line interface (CLI) input of a process;
selecting a first clustering model corresponding to the process based on examining the first CLI input, wherein the first clustering model is created based on a first clustering configuration and a first feature type combination identifying a first set of feature types of a plurality of feature types, wherein:
the first clustering model corresponds to a data set created as a result of an application of a clustering algorithm with the first clustering configuration to a plurality of first feature combinations corresponding to a plurality of CLI inputs, each of the plurality of first feature combinations comprising a corresponding first set of features of the corresponding CLI input, each of the first set of features having a feature type of the first set of feature types;
the first clustering configuration configures the clustering algorithm to cluster the data set into one or more clusters;
creating a first feature combination for the first CLI input based on the first feature type combination, wherein the first feature combination comprises a given feature that is representative of a given pattern of the first CLI input based on a first number of key-value variables included in the first CLI input, a second number of positional variables included in the first CLI input, and a third number of flag variables included in the first CLI input;
evaluating the first CLI input using the first clustering model and the first feature combination, wherein the evaluating further comprises determining a similarity score corresponding to a similarity between the first feature combination and the one or more clusters of the first clustering model;
determining whether or not the first CLI input corresponds to normal behavior based on the similarity score; and
retraining the first clustering model using the first CLI input when the first CLI input corresponds to the normal behavior.

16. The non-transitory computer readable medium of claim 15, wherein the operations further comprise: creating the first clustering model for the process prior to the examining, wherein the creating further comprises: extracting, for each of the plurality of CLI inputs, a plurality of features; generating, for each of the plurality of CLI inputs, based on the corresponding extracted plurality of features, one or more feature combinations corresponding to one or more feature type combinations; applying the clustering algorithm to each of the one or more feature combinations of each of the plurality of CLI inputs with one or more clustering configurations to create a plurality of clustering models including the first clustering model, wherein for each application of the clustering algorithm: the clustering algorithm is applied with one of the one or more clustering configurations; and the clustering algorithm is applied to one of the one or more feature combinations for each of the plurality of CLI inputs; and selecting the first clustering model from the plurality of clustering models.

17. The non-transitory computer readable medium of claim 16, wherein selecting the first clustering model comprises: performing analysis for each of the plurality of clustering models to generate an average score and a standard deviation for each of the plurality of clustering models; identifying one or more clustering models from the plurality of clustering models having average scores above a threshold; generating a ratio for each of the identified one or more clustering models, the ratio corresponding to a ratio of an average score of a corresponding clustering model to a standard deviation of the corresponding clustering model; and selecting the first clustering model from the identified one or more clustering models based on the ratios of the identified one or more clustering models.

18. The non-transitory computer readable medium of claim 17, wherein the first clustering model has a highest ratio among all the identified one or more clustering models.

19. The non-transitory computer readable medium of claim 17, wherein the analysis comprises a silhouette analysis.

20. The non-transitory computer readable medium of claim 16, wherein extracting the plurality of features from each of the plurality of CLI inputs comprises extracting a categorical feature corresponding to a pattern of the corresponding CLI input.

21. The non-transitory computer readable medium of claim 20, wherein: the pattern of the corresponding CLI input corresponds to a number and type of parameters in the corresponding CLI input; and the categorical feature represents the pattern of the corresponding CLI input.

* * * * *